United States Patent [19]
Iwano et al.

[11] Patent Number: 4,818,061
[45] Date of Patent: Apr. 4, 1989

[54] FERRULE FOR CONNECTING OPTICAL FIBERS AND OPTICAL CONNECTOR USING IT

[75] Inventors: Shinichi Iwano, Tokorozawa; Yasuhiro Ando, Houya, both of Japan

[73] Assignee: Nippon Telegraph and Telephone Corporation, Tokyo, Japan

[21] Appl. No.: 858,186
[22] PCT Filed: Sep. 4, 1985
[86] PCT No.: PCT/JP85/00493
§ 371 Date: May 1, 1986
§ 102(e) Date: May 1, 1986

[30] Foreign Application Priority Data
Sep. 5, 1984 [JP] Japan .................................. 59-184440
Feb. 8, 1985 [JP] Japan .................................. 60-23330
May 2, 1985 [JP] Japan .................................. 60-93827

[51] Int. Cl.⁴ ............................................. G02B 6/38
[52] U.S. Cl. ................................. 350/96.21; 350/96.2
[58] Field of Search ............... 350/96.20, 96.21, 96.22

[56] References Cited
U.S. PATENT DOCUMENTS
4,090,778 5/1978 Phillips et al. ...................... 350/96.2
4,264,128 4/1981 Young ............................... 350/96.2
4,362,356 12/1982 Williams et al. .................... 350/96.2
4,458,983 7/1984 Roberts ............................. 350/96.2
4,556,282 12/1985 Delebecque ................. 350/96.22 X
4,579,419 4/1986 Scrivo ............................... 350/96.2

FOREIGN PATENT DOCUMENTS
53-93241 of 1978 Japan .
55-22707 of 1980 Japan .
57-139716 8/1982 Japan .

OTHER PUBLICATIONS
Sixth European Conference on Optical Communication, York, England, (Sep. 16–19, 1980) LeNoane et al., pp. 330-334, "Progress in Low-Loss Interconnection System Design".
Optical Fibre Communication-Technical Staff of CSELT-Torino, Italy-pp. contents, 541-643.

Primary Examiner—William L. Sikes
Assistant Examiner—John Ngo
Attorney, Agent, or Firm—Cushman, Darby & Cushman

[57] ABSTRACT

This invention ferrule which covers an end of an optical fiber is structured to have a larger elastic displacement compared to ordinary ones.

And misalignment at coupling is absorbed, thereby reducing a coupling loss as well as sliding force at the coupling.

20 Claims, 20 Drawing Sheets

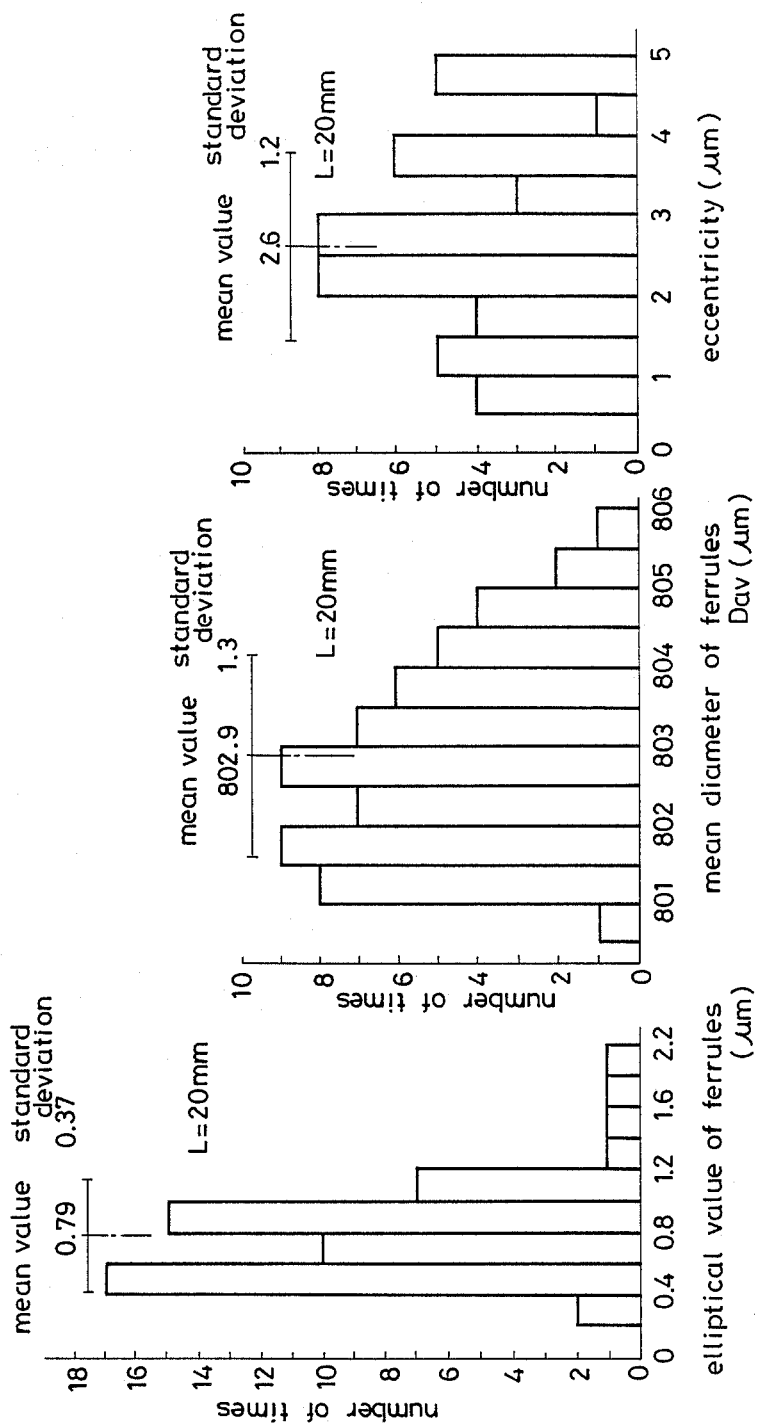

FERRULE FOR CONNECTING OPTICAL FIBERS AND OPTICAL CONNECTOR USING IT

BACKGROUND OF THE INVENTION

1. Field of the Invention

The present invention relates to an optical connector for connecting optical fibers on their ends which are used as a transmission medium in optical communication and to a "ferrule" which is a component part of an optical connector used to sheath the ends of optical fibers.

2. Description of the Prior Art

Optical fibers with excellent transmission characteristics such as high band and low loss have been extensively used recently as a medium in transmission of data and photo-energy. Along with such development, there is keenly felt demand for a method for connecting optical fibers of the diameter of ca. 0.1 mm which are often used for high speed data transmission with low coupling loss at low cost.

Since optical fibers are thin and fragile, connecting optical fibers requires technology more sophisticated than in electric connection. More specifically, in order to connect optical fibers at a coupling point at lower energy loss, it is necessary to align optical axes of two optical fibers at precision of several microns so as to have less gap between interfaces thereof. (This is referred to as alignment of optical axes.)

Conventional methods for connecting optical fibers are outlined, for example, in Technical Stuff of CSELT: "OPTICAL FIBER COMMUNICATION," pp. 541-643, especially pages 571-602 1980, McGraw-Hill New York. They are roughly classified into two: the one which permanently connects optical fibers and the other which employs a connector to allow connection and disconnection of optical fibers. As the present invention is intended for connection between equipments, it relates to the latter category method which connects optical fibers by means of a connector in a manner to allow detachment.

Structure of such optical connectors in the prior art generally comprises ferrules and a sleeve such as shown in Japanese Patent Publication No. Sho 55-22707. The ferrule is tubular and has a circular section which is axially bored a throughhole having a slightly larger diameter than the outer diameter of an optical fiber for receiving the same. A sleeve is a cylindrical member for accurately abutting two ferrules. Optical fibers are connected by inserting terminals of two optical fibers into throughholes on the ends of ferrules respectively, aligning and fixing end faces thereof and the ferrules on the same plane, and inserting the ferrules into a sleeve to abut end faces of the ferrules on each other.

In such structure of optical fiber connection, if there is angular or axial deviation between the optical fibers, coupling loss is increased. In order to achieve excellent connection at low coupling loss, axial or angular deviation should be kept to minimum. Conventional ferrules are designed as rigid bodies to avoid distortion which may lead to axial and regular deviation of the optical fiber axis to thereby prevent any increase in coupling loss. Favorable characteristics of optical fibers such as smaller diameter and flexibility are therefore not fully utilized.

An example of conventional ferrules is shown in FIG. 1. A ferrule 1 is made of stainless steel and comprises a cylindrical part 2 and a flange 3. The diameter D of the cylindrical part 2 (hereinafter referred to as "outer diameter of a ferrule") is 2.5 mm and the length L of the cylindrical part from the flange 3 to an end 4 of the ferrule (hereinafter referred to as "length of a ferrule cylinder") is 8.0 mm. A capillary 7 made of ceramics with a precision bore hole 6 is fitted into the tip end of the cylindrical part 2. The spring constant when fixed as shown in FIG. 2 and deformed by the stress applied on the tip end 4 becomes approximately 20 kg/mm, suggesting the high rigidity of the ferrule. The weight applied at breaking is ca. 10 kg. Displacement at the tip end even at this time is less than 0.1 mm. FIG. 3 shows another type of ferrule of a similar shape to the one shown in FIG. 2. However, this ferrule is not provided with a capillary and made of plastics (PPS resin containing a reinforcing agent). With this ferrule, the spring constant is several tens of kilograms/mm and the weight at rupture is several kgs. The displacement at the tip end is less than 0.5 mm at the time of rupture.

As mentioned above, a conventional ferrule is characterized in that it is rigid and resistive against deformation. It is therefore necessary to position two ferrules precisely not only at a coupling point but also along the whole structure thereof when optical axis are aligned. When the two ferrules each inserted with an optical fiber are abutted as shown in FIG. 4 at a coupling point, a plug 10 cannot be inserted into an adaptor 11 if a ferrule 1' is fixed into the plug 10 at a location deviated from the central axis of a sleeve 14 by a distance H at which the central axes of the end faces 9 and 9' of the ferrules 1 and 1' should be aligned. A forced insertion may result in damage of the ferrule 1' or of the plug or the adaptor as the ferrule 1' is not easily bendable and the bending stress on the ferrule 1' exceeds the yield point. In either case, alignment of optical axes cannot be achieved effectively.

Conventional plugs and adaptors therefore needed high precision in manufacturing. Alternatively ferrules are raised from the plug by a spring while securely held by a sleeve with enough force in order to avoid any axial and angular deviation between the ferrules. However, if the retentive force is increased, friction between the sleeve and the ferrules increased, and the force needed for pulling out the plug unavoidably increases. At the same time, friction between the sleeve and the ferrules might cause damage. If an increased force should be applied for pulling out the plug, that would present a problem in the development of multicore optical connectors. In addition, dust generated from the friction contributes to increasing of the loss.

Optical fiber connectors are expected to be packaged at higher density in near future and for that purpose, ferrules which are the basic component of a connector should be reduced in size. The prior art ferrules needed high strength to resist against outer forces rigidly as they are not easily bendable. Due to this requirement in strength, conventional ferrules cannot be reduced in outer diameter beyond a certain limit. The length of a sleeve cannot be shortened very much as coupling of ferrules at low loss requires the length to be several times of the outer diameter of the ferrules. The conventional rigid ferrules therefore cannot be reduced in size beyond a certain value.

Further, as the prior art ferrules are rigid, the structure of optical axis alignment using the flexibility of optical fibers which is an advantage of the slice method is not employed. Such method is proposed, for instance, in Japanese Utility Model Application laid-open No. Sho 53-93241. The method is for connecting optical fibers permanently by pressing an optical fiber against a corner with a bending stress generated from bending of the fiber and accurately aligning the optical axis of optical fibers with relative positional relation between the corner and the optical fiber. Japanese Patent Application laid-open No. Sho 57-139716 discloses a connection method which employs the flexibility of optical fibers. That is the method of pressing each optical fiber against a v-shaped grooved element with a retention spring for alignment of optic axes. The method allows to absorb mismatching of optical fibers in the axial direction with the flexibility thereof and as v-shaped groove elements are of low cost and the dimensional precision used in the method is not so high, greater economic advantage is expected.

The methods using the flexibility of optical fibers have been known in the prior art, but as fragile optical fibers are used naked in all of these methods, the methods cannot be employed for optical fiber connectors which connect optical fibers in a detachable manner. Moreover, as the prior art ferrules are not easily bendable, the methods are hardly applied.

An object of this invention is to provide a ferrule which can be precisely positioned and aligned on an end face thereof with another ferrule at a coupling point by absorbing mismatching between the two ferrules with suitable deformation thereon even if they are fixed at axial positions which are missligned from each other.

Another object of this invention is to provide a ferrule which is not broken or damaged even if it is subjected to deformation lby distributing outer force evenly with elastic deformation.

Still another object of this invention is to provide a ferrule which needs less force for aligning optical axes by making the ferrule per se flexible.

Still another object of this invention is to provide a ferrule which is advantageous economically.

Still another object of this invention is to provide a ferrule of a smaller size which can be applied in a high-density optical connectors.

Still another object of this invention is to provide a connector which is applied with an optical axis alignment mechanism utilizing aforementioned flexibility.

Still another object of this invention is to provide an optical connector which needs smaller force for insertion as well as pull-out.

SUMMARY OF THE INVENTION

This invention is characterized in that a cylindrical part of a ferrule for optical fiber connection generates a large elastic displacement. More particularly, if Young's module is represented with $E_f$ and the yielding stress with $S_f$, $L^2/D$ is 2.4 times of $E_f/S_f$ or more.

This invention is characterized by the structure in that a ferrule can be bent and deformed practically with a suitable force to absorb misalignment with the deformation, thereby reducing coupling loss and preventing damages on ferrules.

This invention is further related to the structure where ends of two optical fibers sheathed in ferrules are abutted on each other to couple optical signals of the two optical fibers, which is characterized in that each of said ferrules has a cylindrical portion which is elastically bendable in structure, and the two ferrules are abutted on each other along a groove having V-shaped section or in a sleeve, or pressed on an aligning surface with a deforming means.

It is necessary to precisely align ferrules without angular or axial misalignment at a coupling point in order to connect optical fibers at a low coupling loss. Due to dimensional errors in manufacture of component parts of a plug and an adaptor (tolerance), there are dimensional fluctuation in the plug and adaptor. If the tolerance is made more strict, the manufacture cost will increase. It is therefore desirable to permit a larger tolerance within a scope. As the tolerance is generally ca. 0.1 mm in not very strict manufacture, misalignment errors which may be caused in assembling a plug and an adaptor should be limited to ca. 0.5 mm. Due to the advantageous structure of this invention ferrule which allows elastic deformation, such mismatching can be absorbed. More specifically, even when a ferrule is fixed at a position deviated by about aforementioned distance from the extension of the optical axis at a coupling point, the ferrule can be flexibly bent to align accurately an end thereof with another ferrule at a precise position on the optical axis.

BRIEF DESCRIPTION OF DRAWINGS

FIG. 10 is a histogram of the roundness of a ferrule.

FIG. 11 is a histogram of average diameter of a ferrule.

FIG. 12 is a histogram of eccentricity of a precision bore hole of a ferrule.

--- wherein:  1 ferrule     2 cylindrical part

-continued

| | | | |
|---|---|---|---|
| 3 | flange | 4 | tip end |
| 6 | precision bore hole for optical fiber | 7 | capillary |
| | | 8 | coupling point |
| 9 | end face | 10 | plug |
| 11 | adaptor | 13 | aligning face |
| 14 | sleeve | 15 | root of the cylindrical part |
| 16 | retention spring | | |
| 17 | v-shaped grooved element | 18 | v-shaped groove |
| | | 22 | axial compression spring |
| 21 | guide member | 24 | unlocking member |
| 23 | projection | 27 | optical fiber core |
| 25 | lock spring | 30 | aligning face |
| 29 | optical axis | 32 | contact point between a ferrule and reference face |
| 31 | base of the coupling face | | |
| 36 | guiding groove on spring base | 37 | coil spring |
| | | 40 | rear part of spring base |
| 39 | projection for stop | | |
| 41 | pressing surface on the rear part of spring base | 42 | adaptor body |
| | | 43 | guide |
| | | 47 | plug |
| 45 | retention spring base | 48 | plug body |
| | | 50 | screw nut |
| 49 | axial compression spring | 53 | projection for supporting rotation |
| 51 | guide | 56 | lock lever |
| 54 | projection | 58 | projection |
| 55 | projection | 61 | adhesive |
| 57 | projection | | |
| 59 | optical fiber | | |

PREFERRED EMBODIMENTS OF THE INVENTION

Figure 5:
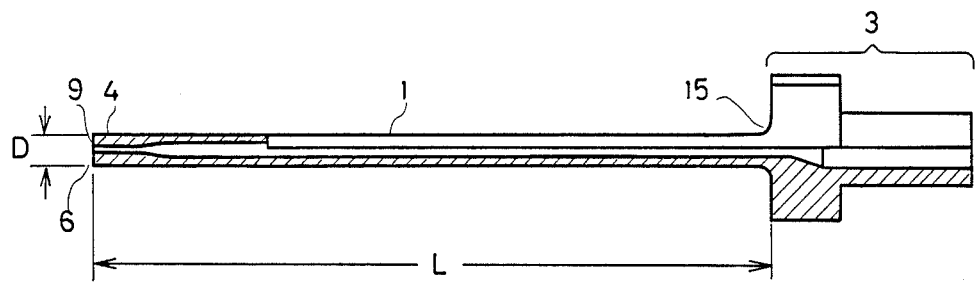
FIG. 5 is a partially exploded structural view of a ferrule according to this invention.

FIG. 5 is a structural view of an embodiment of the ferrule according to this invention. The ferrule has an integral structure made of epoxy resin containing silica in granule form. The hatched portion in the figure shows the cross section along the central plane. The ferrule is tubular, and extends in the length L which is tapered in the inner diameter at the left end 4. The tapered end defines a precision bore hole 6 through which an optical fiber is to be inserted. An optical fiber is inserted at the end thereof through the ferrule from the right in the figure to extend through the hole 6 and reach a coupling end face 9. The inner diameter of the hole 6 is determined to be slightly larger than the outer diameter of an optical fiber so that the optical fiber is secured therein. Another ferrule of identical structure with the one shown in the figure is abutted at the coupling ends 9 in use so that optical signals of the optical fibers within the two ferrules are coupled. The reference numeral 15 denotes a base of the ferrule.

The material of the ferrule is epoxy resin mixed with reinforcing agent of granule silica. The other diameter D of the ferrule is 0.8 mm while the length L of the ferrule cylinder 20 mm. The end 4 of the ferrule 1 is bored the hole 6 without eccentricity from the central axis of the ferrule. As stress is concentrated on the base 15 of the portion with smaller diameter at the time of deformation, the portion is structured so that the diameter changes gradually to distribute stress evenly and to give sufficient strength.

Figure 2:
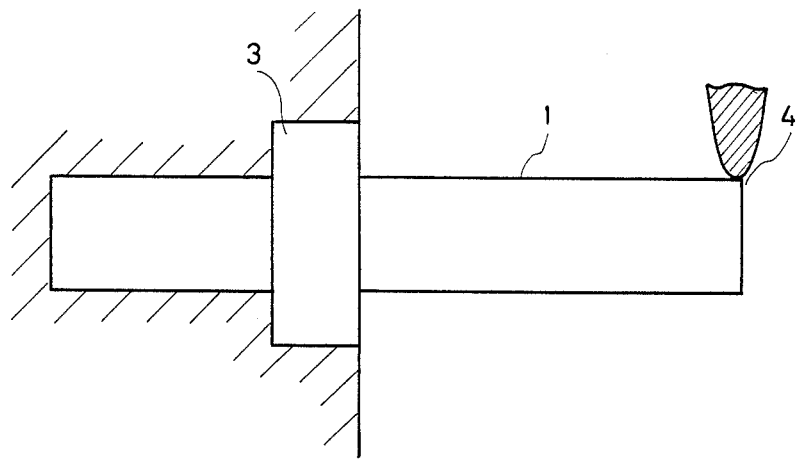
FIG. 2 is a view to explain deflection on a ferrule.
Figure 3:
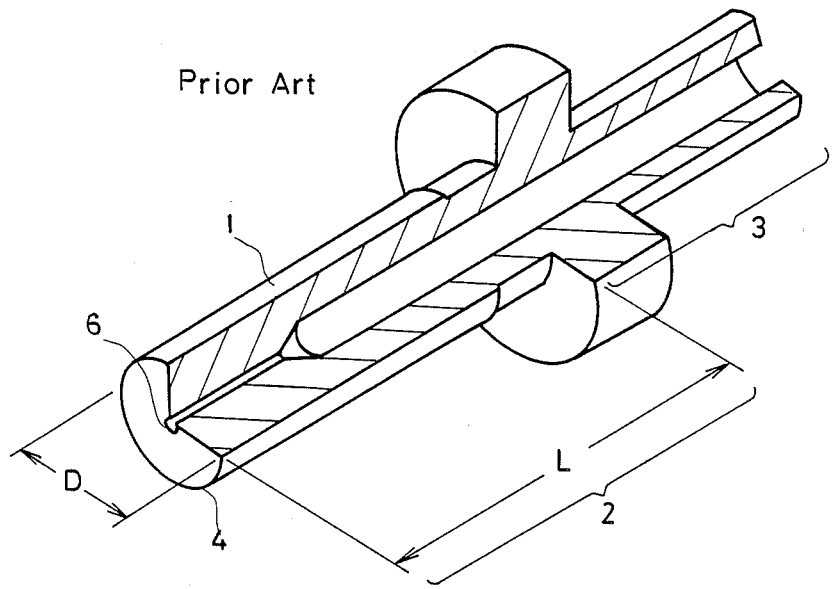
FIG. 3 is a structural view of a prior art ferrule.

In the embodiment, when a flange 3 of the ferrule is fixed as shown in FIG. 2 and deformed with a force applied on the end 4, the spring constant becomes several ten grams/mm. That indicates this invention ferrule dis much less rigid compared to the prior art ferrules. Under this condition that a load vertical to the axis is applied on an end of a ferrule, no damage or plastic deformation occurs even if the end is deformed by ca. 3 mm because the stress is distributed uniformly with elastic deformation. This means that the invention ferrule permits deformation more than ten times of the prior art.

Figure 6:
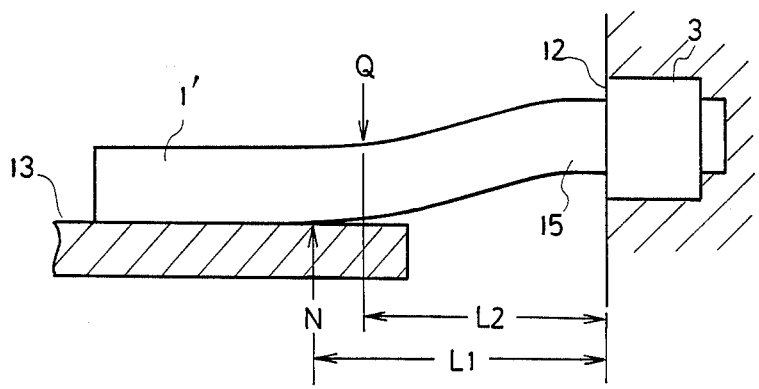
FIG. 6 is an explanatory view of deflection on a ferrule.

If the flange and the end of a ferrule are deformed in parallel to the axis as shown in FIG. 6, the axis could be shifted up to 0.5 mm. even if the flange of a ferrule is slightly deviated from the extension of the optical axis at the coupling point in manufacture, the ferrule is flexible enough to be deformed and to precisely align the end with another ferrule at the coupling point.

When a sleeve is utilized in alignment of ferrules, retentive force required on the sleeve can be reduced in this invention as the inventive ferrule per se is softer than the prior art rigid ferrules. This makes the friction between the sleeve and ferrules smaller/and this also reduce dust and powder which increase connection loss. This also can reduce the force required for insertion/pull-out.

For the high density packaging of optical fiber which is expected in near future, components of an optical connector and especially ferrules should be reduced in size. The prior art ferrules are made with a large outer diameter to increase strength so as to prevent deformation or damage of the ferrule even if an outer force is applied (rigid structure). This invention ferrule has a softer structure to distribute outer force evenly with elastic deformation (soft structure). This invention ferrule therefore has a larger deforming capacity and is resistive against damages even with a smaller diameter. When a sleeve is used to position ferrules, it is empirically known that the length of a sleeve should be several times longer than the outer diameter of a ferrule. As the diameter of a ferrule is reduced in this invention, the sleeve can be made compact. Further, reduction of the force required for tightening on the sleeve contributes to reduction of sleeve size. As described above, this invention can provide a small sized optical connector element which is applicable to high density multi-core connectors.

Figure 4:
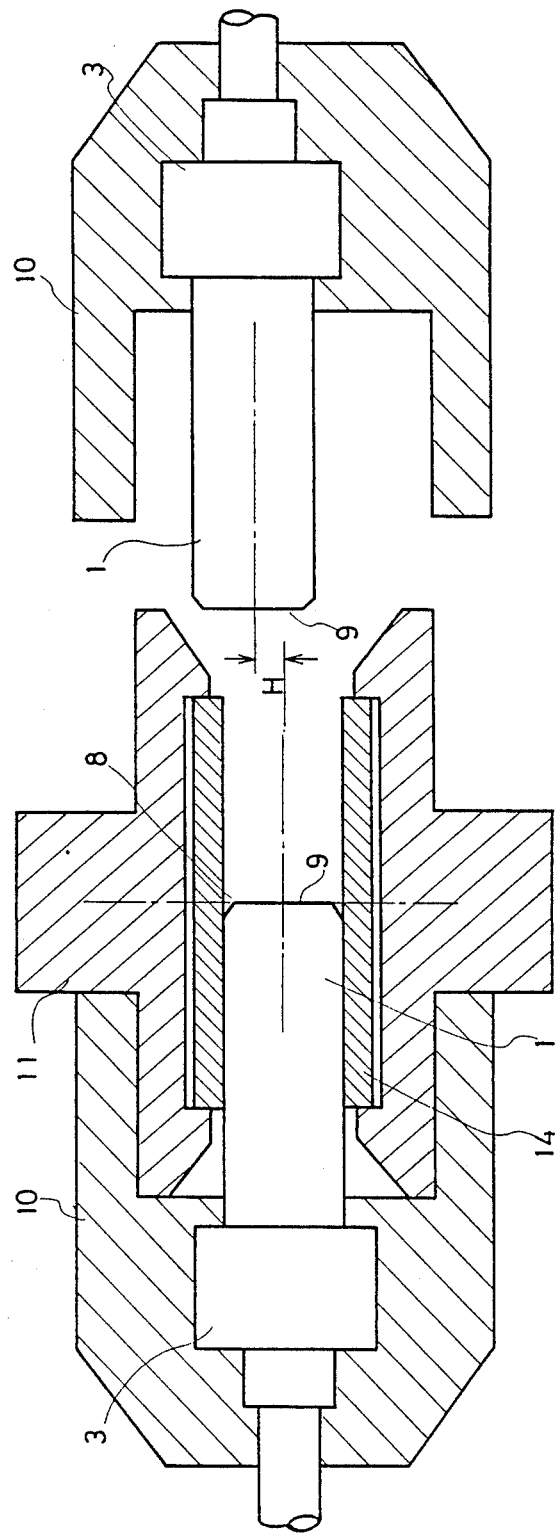
FIG. 4 is an explanatory view of misalignment of axes of two ferrules.
Figure 7:
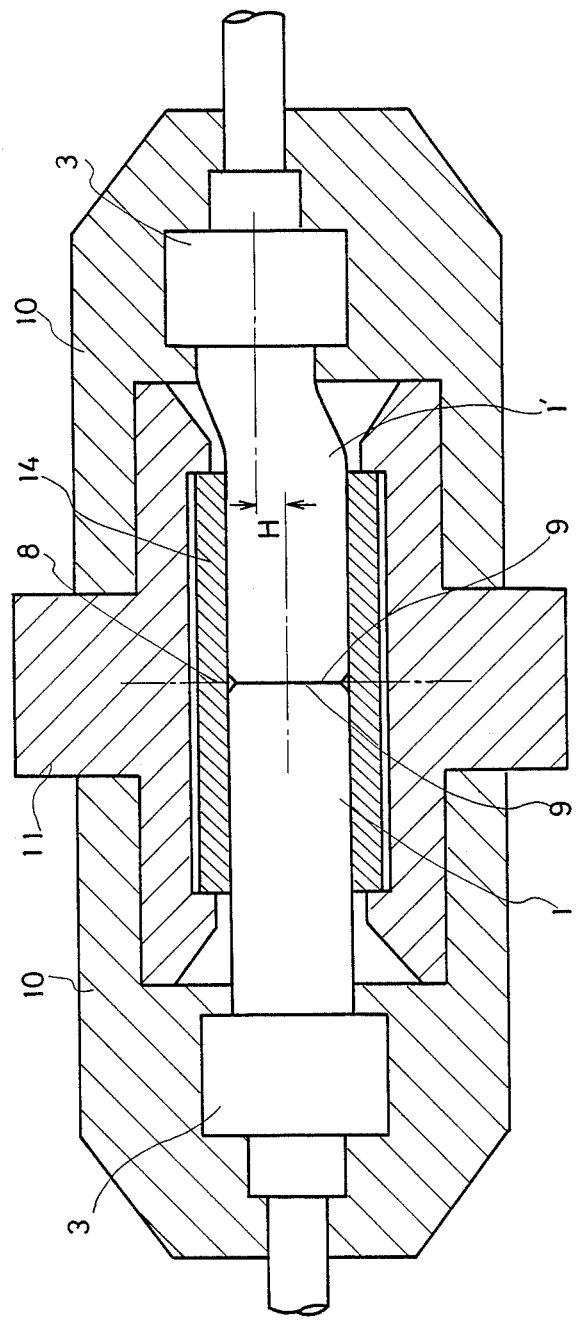
FIG. 7 is a structural view of an optical connector which connects ferrules in abutment.

The conditions required for such deformation will be described hereinafter. FIG. 4 shows a simplified model of misalignment H from axis when a plug 10 is fitted in an adaptor 11. It is assumed that there is no deviation in angle. A condition is assumed that although an end face 9 of a ferrule 1' is wished to be positioned precisely at a coupling point 8 in FIG. 4, a deviation H is caused between the extension of the axis on the flange 3 and the central axis of the end face 9 as shown in FIG. 7, and the ferrule 1' should be deformed to connect the two points with a moderate curve. Such a deformation on the ferrule 1' is schematically expressed in FIG. 6. The ferrule 1' is deformed with the force Q applied at a location apart from the fixed face 12 thereof by the distance $L_2$ and with the resisting force N in the direction opposite to the force Q applied from the aligning face 13 at a location apart from the face 12 by the distance $L_1$. By setting the force Q at a suitable value, it becomes possible to position the end of the ferrule precisely at a location.

Caution should be taken to avoid plastic deformation or damage of the ferrule per se with the deformation. Damages and plastic deformation occur when the stress generated by the deformation exceeds the yielding stress at a location. In the case where a ferrule is deformed as shown in FIG. 6, the maximum bending stress S occurs at the base 15 of the ferrule, which can be expressed as below if the Young's module is represented with $E_f$;

$$S = 3 \cdot HE_f DL_2 Q/(6 \cdot HEI + L_2^3 Q) \tag{1}$$

wherein EI denotes an amount of flexural rigidity. If the ferrule is assumedly structured with an optical fiber at the center thereof, and the diameter and Young's module of an optical fiber are represented with A and $E_0$ respectively, the equation below holds:

$$EI = 0.05[E_0 A^4 + E_f(D^4 - A^4)] \tag{2}$$

The bending stress S increases in proportion to the force Q, and converges at a given value $S_1$ when the force Q becomes sufficiently large.

$$S_1 = 3 \cdot HE_f D/L_2^2 \tag{3}$$

In other words, the maximum bending stress S which may generate in the deformation shown in FIG. 6 will not exceed $S_1$. In order to generate aforementioned deformation without damaging ferrules, the yielding stress $S_f$ of the ferrule material should be larger than $S_1$ of the expression (3).

$$S_f > 3 \cdot HE_f D/L_2^2 \tag{4}$$

An axial force is applied on ferrules so as to closely attach ends of ferrules, but $L_2$ should satisfy the following condition in order to avoid buckling at the end as disclosed in Japan Patent Application laid-open No. Sho 57-139716.

$$L_2 \geq 0.8 \cdot L \tag{5}$$

$L_2$ can be set as follows accordingly.

$$L_2 = 0.8 \cdot L \tag{5'}$$

As described above deviation around 0.5 mm is expected due to the fluctuation in alignment errors caused when a plug is fitted with an adaptor. Therefore, H can be expressed with the expression below:

$$H \leq 0.5 \text{ mm} \tag{6}$$

A formula can be obtained for the condition which allows necessary deformation without damaging ferrules by substituting $L_2$ of the expression (5') and the maximum Hm of H in the formula 6 (0.5 mm) into the expression (4).

$$(L^2/D) > 2.3 \cdot (E_f/S_f) \tag{7}$$

The formula 7 gives the minimum of $L^2/D$. Even if the diameter D is further reduced, the formula 7 is also satisfied. The inventive ferrule is essentially suitable for small size.

Figure 8:
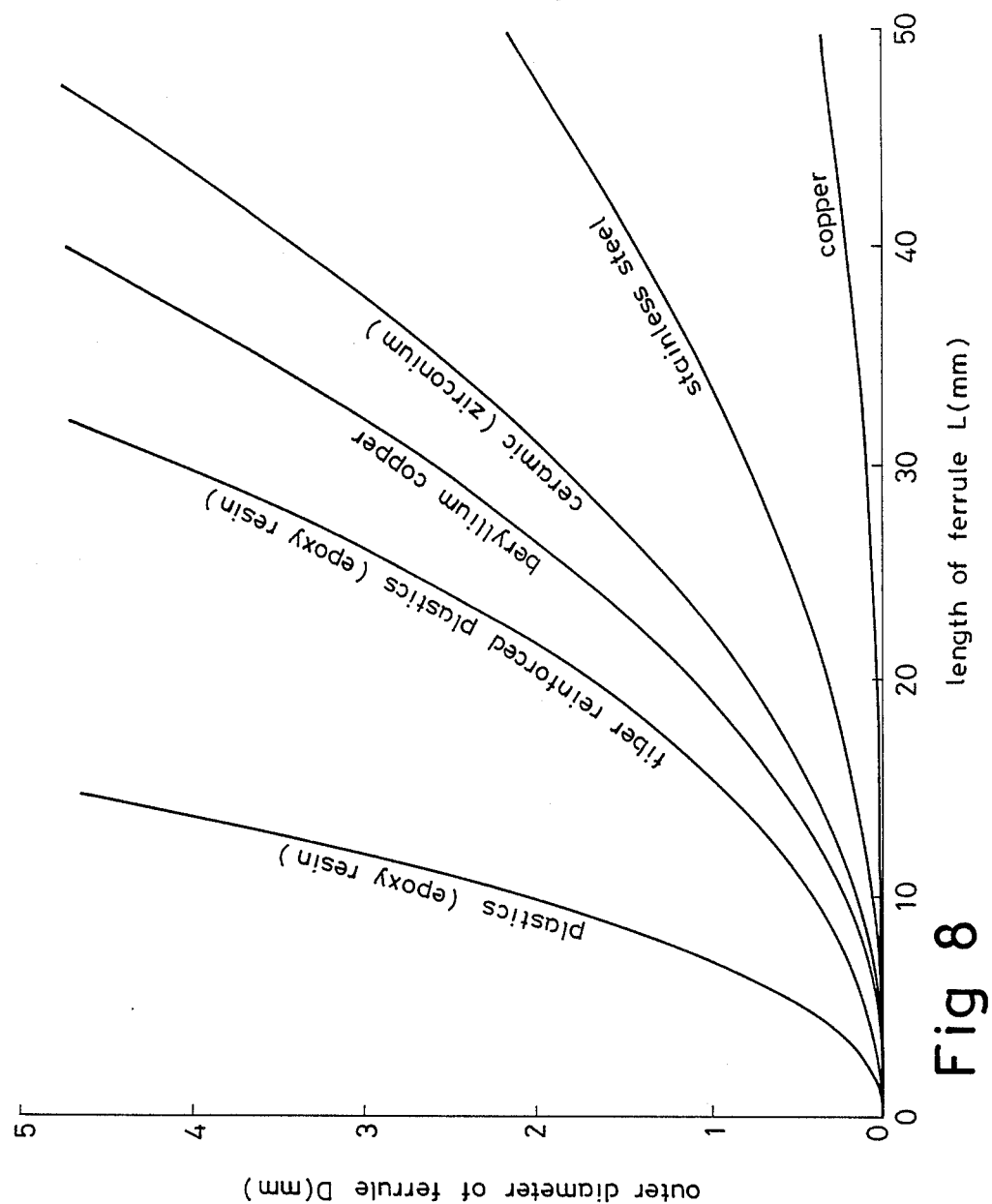
FIG. 8 is a graph to show the relation between the outer diameter and the length of a ferrule. It shows the relation which is expressed as $L^2/D > 2.3$ $(E_f/S_f)$ wherein D denotes the outer diameter of a ferrule, L the length of the cylindrical portion of the ferrule, $E_f$ the Young's module of material and $S_f$ the yielding stress.

FIG. 8 shows the result of calculation made for material constants of various materials with the formula 7. For each material, the portion to the right of the solid lines in the graph denotes the regions where this invention can be applied. The wider the region is, the more flexible becomes the design of ferrules. According to the graph, it is obvious that a material having a small elastic modulus and a large yielding stress, such as plastics, is suitable for the material for these novel ferrules. For a higher moldability at a high precision, synthesized resin material containing reinforcing filler would be optimal.

The force Q is a force applied on the ferrule 1 with retentive force of the sleeve 14 in FIG. 7, and also it may be given with a retention spring on the ferrule 1 as described hereinafter. In both cases the intensity of the force Q should be suitable. If it is assumed the minimum force necessary for presisely positioning the ends of ferrules is $Q_2$ in intensity, $Q_2$ can be obtained as below using elastic deformation analysis.

$$Q_2 = 6 \cdot HEI/[(L_1 - L_2)L_2^2] \tag{8}$$

$L_1$ can be expressed as below.

$$L_2 < L_1 \leq L \tag{9}$$

As $Q_2$ should have an intensity which can be generated with an ordinary spring, it should preferably be 100 g or less.

$$Q_2 \leq 100 \text{ g} \tag{10}$$

$L_1$ is selected as its maximum value L, and formulas (2), (5'), (6) and (10) are substituted into the formula (8). And the formula (11) is derived as a condition which the ferrule deforms to a desired shape under the force less than 100 g.

$$L \geq 0.01 \cdot [E_0 A^4 + E_f(D^4 - A^4)] \tag{11}$$

Description will now be given to the deformative capacity in this invention. Outer force applies to a ferrule especially when a plug is attached/detached. Generally, as a ferrule is fixed or held on the flange thereof with the plug by means of a spring, the generated stress becomes maximum at root of the cylindrical part of the ferrules.

As shown in FIG. 2, when the flange 3 of the ferrule is fixed, and a force vertical to the axis is applied on an end 4 of the ferrule to deform the same, the relation between displacement W and the maximum bending stress $S_2$ can be expressed as below.

$$S_2 = 1.5 \cdot E_f DW/L^2 \tag{12}$$

When the maximum bending stress $S_2$ exceeds the yielding stress $S_f$, the ferrule breaks. By solving the above formula by substituting the left hand member with $S_f$ of the expression, the displacement $W_f$ at an end when braking begins (this is referred to as the maximum deformable value) can be obtained.

$$W_f = 0.67 \cdot S_f L^2/(E_f D) \tag{13}$$

$W_f$ becomes as below if the expression 7 is substituted in the expression 13 according to this invention.

$$W_f > 1.6 \text{ mm} \tag{14}$$

Figure 1:
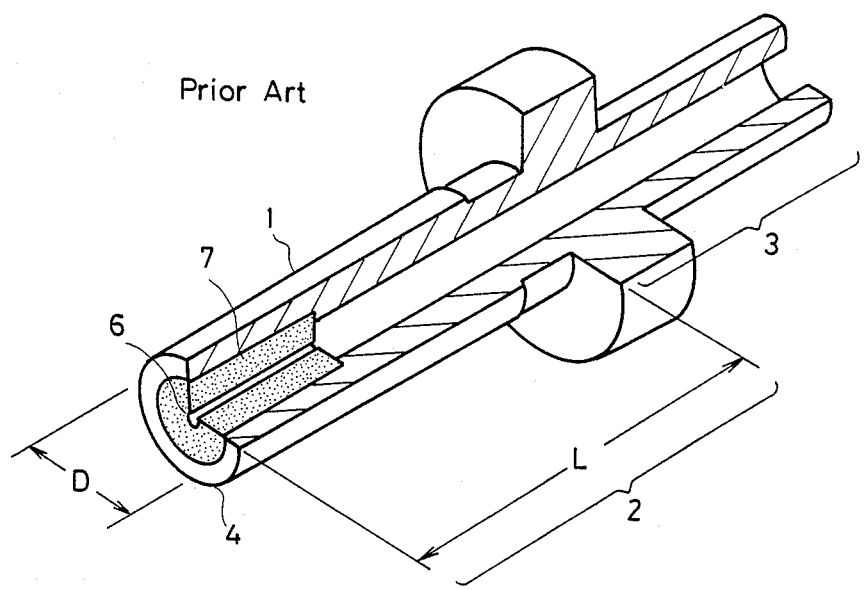
FIG. 1 is a structural view of a prior art ferrule.

The maximum deformable value becomes 1.6 mm or higher which is larger than the prior art ferrule at least by four to one hundred folds. For example, if this invention ferrule is compared with a conventional ferrule made of the same material (plastics or PPS resin with reinforcing agent), the maximum deformation value $W_f$ is 0.2 mm in the prior art ferrule while this invention ferrule has seven fold value more. If compared with another prior art ferrules shown in FIG. 1, this invention ferrule can have a 45 fold value or more. As described in the foregoing, this invention ferrule can have a larger maximum deformative value than the prior art and therefore, is more resistive against deformation.

Figure 9:
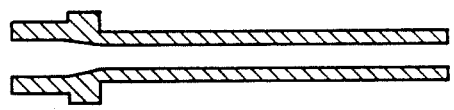
FIG. 9 is an exaplanatory view of a manufacturing method of a ferrule.
Figure 9:
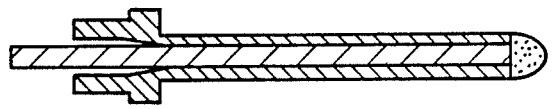
Figure 9:
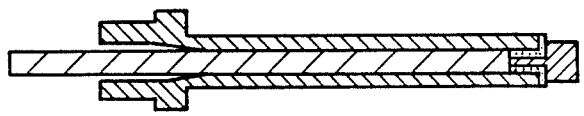
Figure 9:
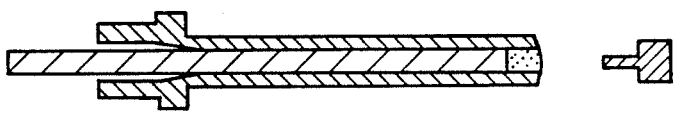
Figure 9:
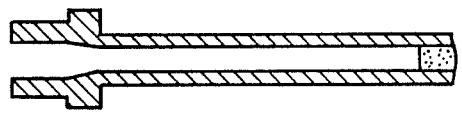
Figure 9:
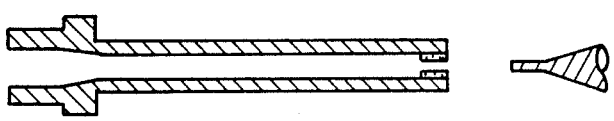

An example of manufacturing method of this inventive ferrule is described below for a plastic material. FIG. 9 are cross sectional structural views sequential to the manufacturing steps. An original shape of a ferrule is molded with a metal die first (a); a stainless steel rod is inserted through the tube and a certain amount of resin is piled on an end thereof (b); a pin is inserted through the piled up resin (c); the pin is pulled out and the resin is hardened (d); the stainless steel rod is pulled out after the resin has been hardened (e); a precision bore hole is bored on an end with a drill having a diameter equivalent to the outer diameter of an optical fiber (f).

The roundness and average diameter at the end of the ferrule manufactured by this method are shown in the histograms in FIGS. 10 and 11. Fluctuation in the roundness and average diameters remains within ca. 1 μm range. This confirms that the above method can manufacture ferrules having necessary dimensional precision.

FIG. 12 shows eccentricity in the precision bore hole. They average at ca. 3 μm. The trial production confimed that an end of a ferrule can be manufactured at the precision of several microns in average diameter, deviation of roundness and eccentricity.

Figure 13:
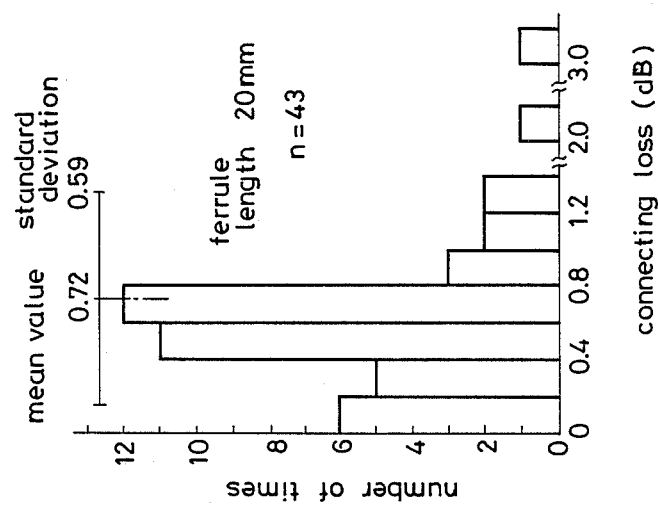
FIG. 13 is a histogram of coupling loss.

FIG. 13 shows coupling loss of a ferrule measured by a v-groove method under the condition that stationary mode: 0.85 μm LED stabilized light source, mode filter for GI type optical fiber loss measurement (half value width numerical aperture 0.11±0.02), retentive force ca. 100 g, and compression force ca. 200 through 600 g. It is obvious from the above, coupling loss averages ca. 0.7 dB even if there is eccentricity of ca. 3 μm present.

Figure 14:
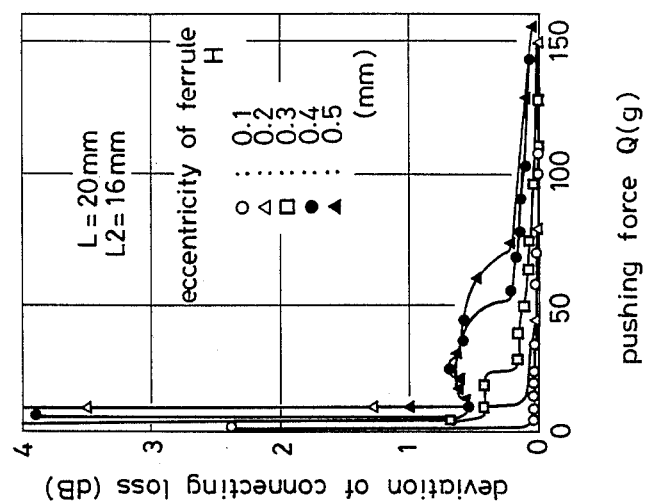
FIG. 14 is a view to show the dependency of the coupling loss on pressure.

FIG. 14 is a graph to show variation of coupling loss when an inventive ferrule is deviated from the predetermined precise position as shown in FIG. 6. By receiving a retentive force, the ferrule is deformed enough to position an end thereof at a precise location, reducing coupling loss drastically. If the ferrule is deviated by 0.5 mm, and if the retentive force of 100 g is applied, the ferrule is deformed to absorb such axial or angular deviation to thereby align ferrules precisely and to secure accurate connection.

A novel optical connector becomes possible if this optical axis aligning mechanism is applied in an optical connector.

Figure 15:
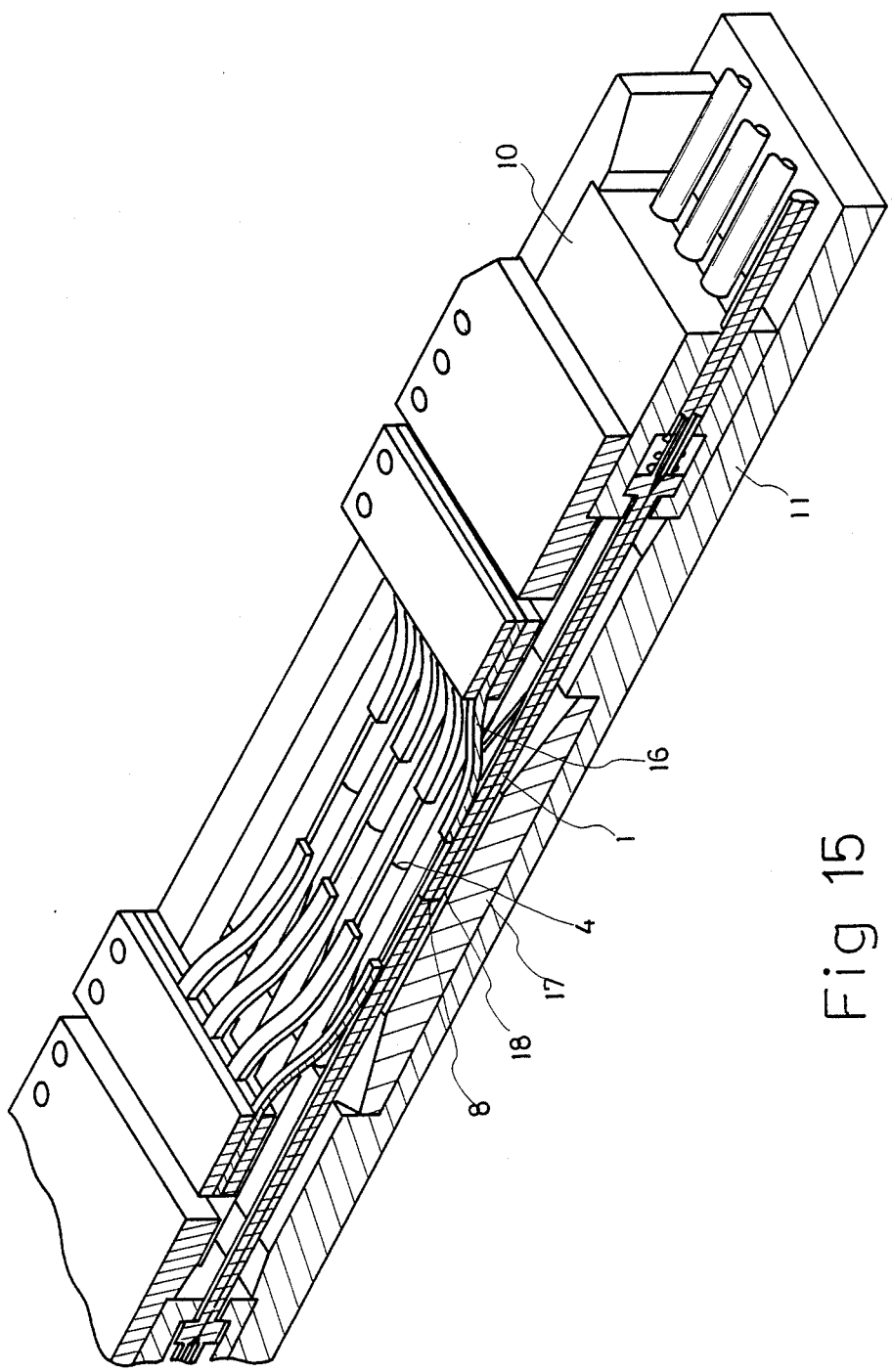
FIG. 15 is a perspective view of an embodiment of a connector according to this invention.

FIG. 15 shows a structural view of an embodiment of this inventive connector wherein the aligning mechanism with compression springs and v-grooves disclosed in Japanese Patent Application laid-open No. Sho 57-139716 is applied for an optical connector. With a spring 16, a ferrule 1 is deflected resiliently and an end 4 thereof is pressed along a v-shaped groove 18 of a groove element 17. Alignment is made using both faces of the v-shaped groove 18 as datum plane. V-shaped grooves are cheaper than sleeves and therefore, an optical connector is produced economically. Even if the position of a plug 10 is displaced slightly, the ferrule 1 can be deflected to absorb such deviation and be aligned at a precise location 8. If only the v-shaped groove 18 is manufactured at a high precision, the dimensional precision of plugs 10 or adaptors 11 may be not so strict. This further contributes to reduction of manufacturing cost of the optical connector and to enhancement of operability.

Figure 16:
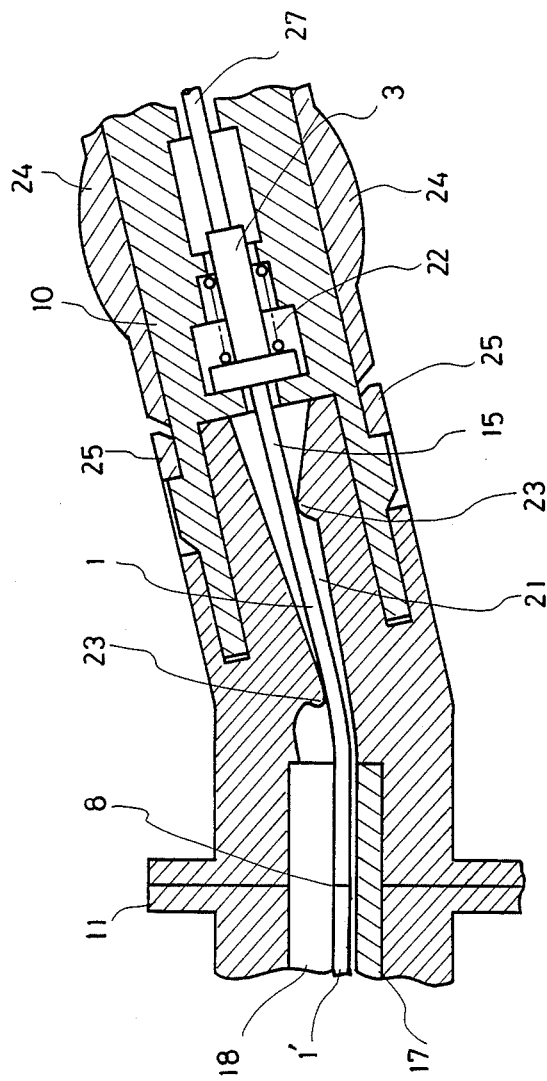
FIG. 16 is an explanatory view to show how a ferrule is bent in a connector.

FIG. 16 shows another embodiment of the connector according to this invention wherein deforming means are projections which are provided directly within the body of an adaptor to apply a force on the ferrule. The aligning face in this embodiment is defined with a v-shaped groove 18 on a v-shaped groove element 17 embedded within the body of an adaptor 11.

The adaptor 11 includes a guide 21 and a spring 25 for locking as well as a v-shaped groove element 17 for aligning which incorporates a v-shaped groove therein. The guide 21 is provided with two projections which are used to deform the ferrule 1 into a predetermined form. More particularly, the deformation of the ferrule 1 inserted in the adaptor 11 is determined with the relative position between the two projections 23 and the v-shaped groove 18. The relation is determined so that a location apart from the end by at least 1 mm comes to contact with the v-shaped groove 18 at two points when the end of the ferrule reaches the center of the adaptor or the coupling point 8.

The plug 10 includes a ferrule 1, springs 22 which loosely fixes the ferrule and at the same time, applies a compression force on the ferrule axially, and a member 24 for unlocking.

As a plug 10 is being inserted into an adaptor 11, the end of the ferrule 1 is directed to the v-shaped groove via the guide 21, deformed with projections 23, and pressed onto a v-shaped groove 18 with a bending stress generated from the deformation. This aligns optical axis of the v-shaped groove 18 or the aligning face with the end of the ferrule to achieve connection at a low coupling loss without angular or axial deviation.

The shape of the deformed ferrule might be slightly changed as the base 15 thereof change its position, but is determined mainly by relative position between the v-shaped groove 17 and the projection 23. Even if the base 15 of the ferrule is not positioned precisely due to dimensional fluctuation in components of the plug, the end of the ferrule can be positioned at a precise position and connected with another ferrule at low coupling loss.

The projection and the guide on the adaptor body comprises various curved faces which can be manufactured by plastic molding process and if the adaptor body is divided into a few components, by machining metals.

Although the projection is directly provided on the adaptor body, it may be a separate component for facilitating the manufacture.

The positional relation between the projection and the v-shaped groove and the number of projections which determines the deformation of ferrule may be arbitrary so long as the bending stress generated by the deformation is less than the yielding point and the end of the ferrule is sufficiently pressed against the aligning face.

Figure 17:
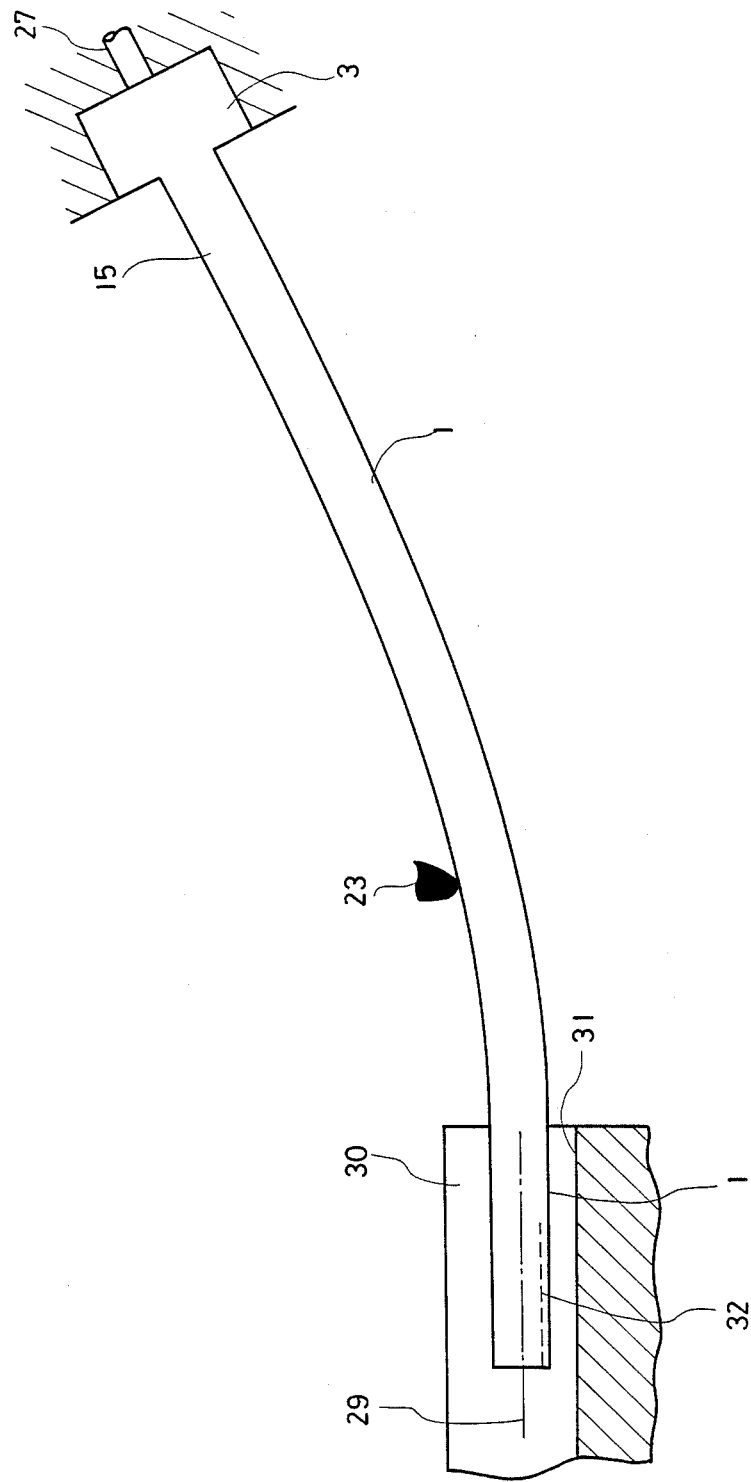
FIGS. 17, 18 and 19 are explanatory views of force applied on a ferrule and bending.
Figure 18:
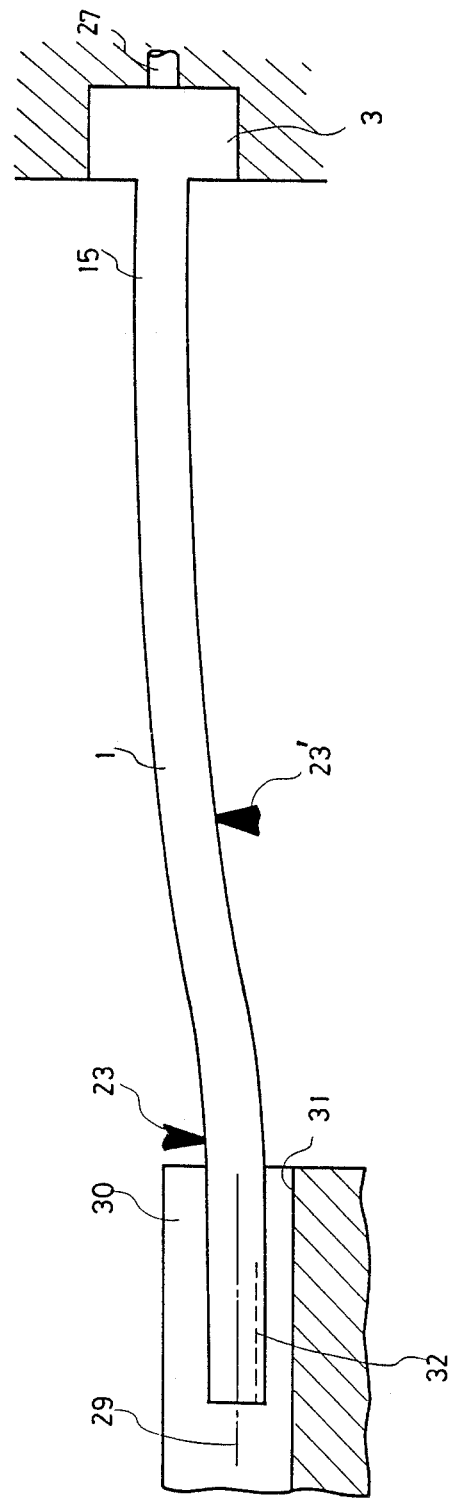
Figure 19:
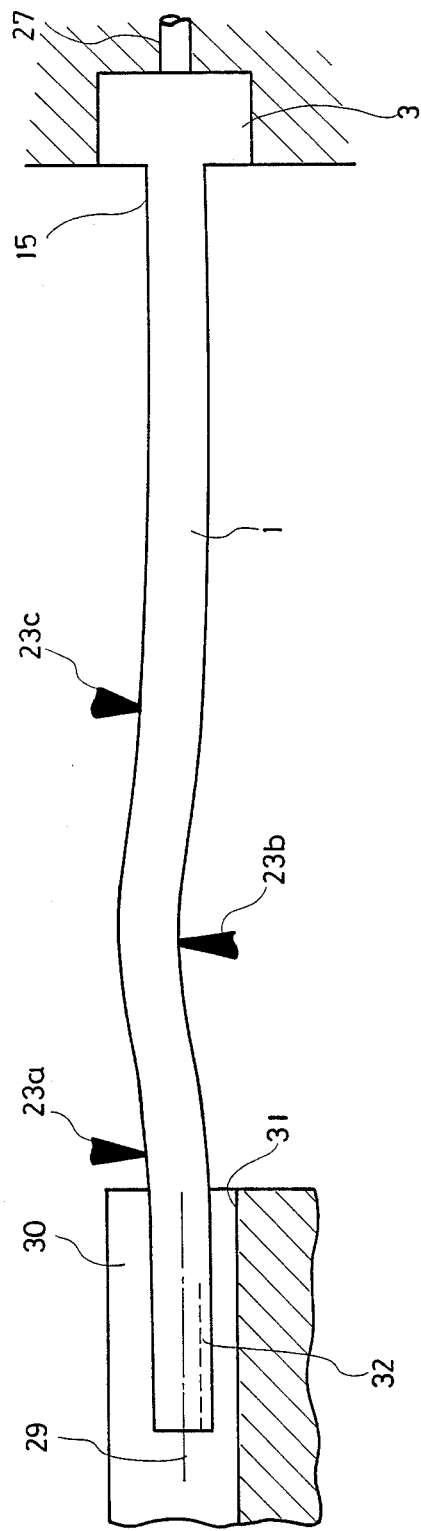

Besides these embodiments, those shown schematically in FIGS. 17, 18 and 19 are feasible.

FIG. 17 shows an embodiment wherein a projection 23 defines the deforming means. The projection 23 applies a force on the ferrule 1 in the direction approaching toward the optical axis 29 of the aligning face to press the end of the ferrule against the aligning face 30. The reference numeral 31 denotes the base of a datum plane face, and the broken line 32 a contact point between the reference plane and the ferrule. The reference numeral 27 denotes an optical fiber.

FIG. 18 shows an embodiment wherein two projections 23, 23' form defoaming means. The projection 23 applies a force on the aligning face in the direction approaching toward the optical axis 29 while the projection 23' applies a force on the ferrule 1 in the direction away from the optical axis 29. The ferrule 1 is deformed with these forces and the end thereof is pressed against the aligning face 30.

FIG. 19 shows another embodiment wherein three projections 23a, 23b, 23c form deforming means. The projections 23a and 23c apply forces on the ferrule in the direction approaching to the optical axis of the aligning face 29 while the projection 23 applies a force in the direction away therefrom. The ferrule 1 is deformed with these forces and the end of the ferrule is pressed against the aligning face 30 mainly with the forces of the projections 23a and 23b.

Figure 20:
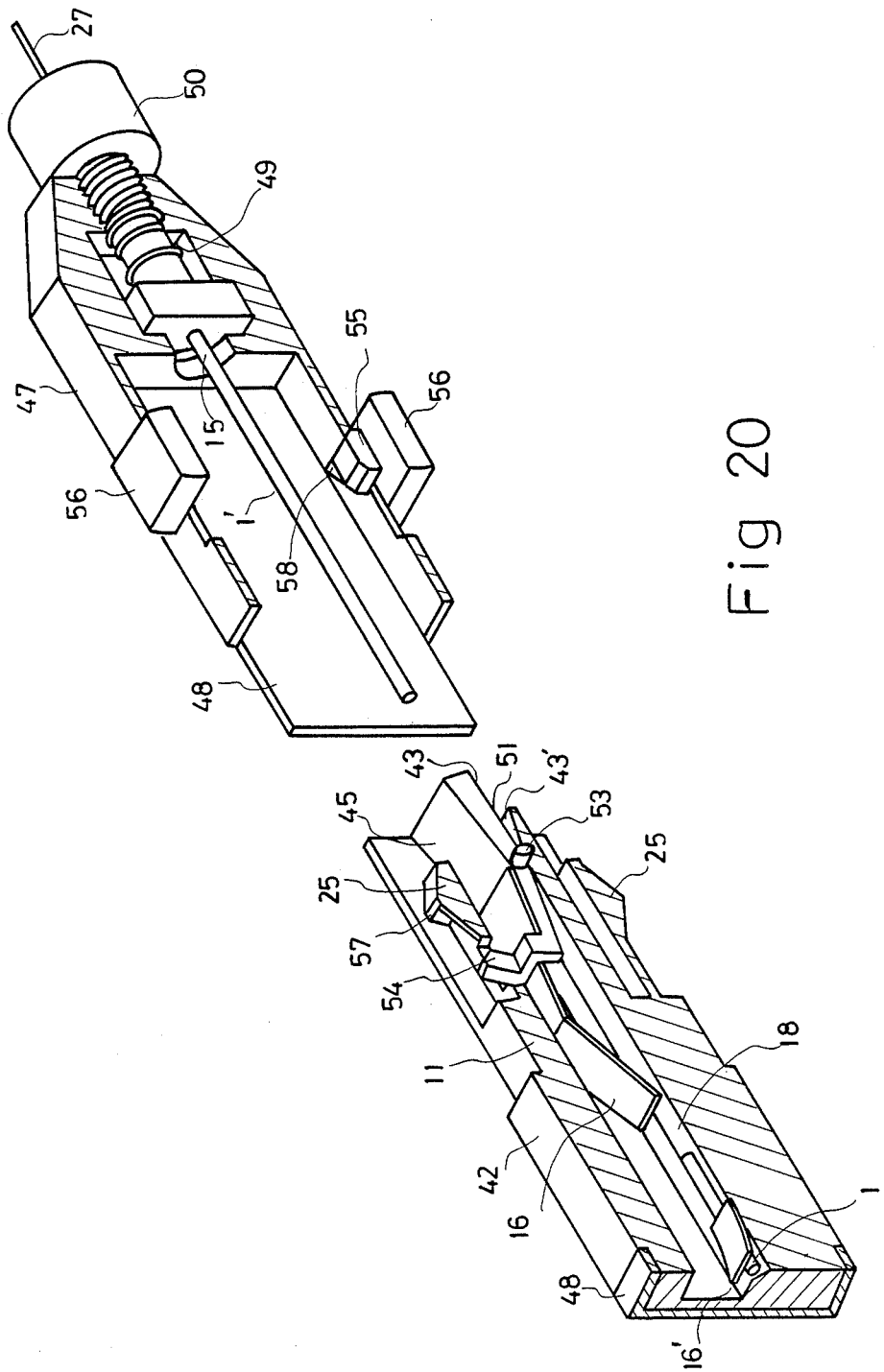
FIG. 20 is a partially exploded structural view of an optical connector according to this invention.

A ZIF Connector (zero insert force connector) is shown in FIG. 20 which needs very slight inserting force. FIG. 20 is a partially exploded perspective view of an embodiment of this invention which has a structure that a ferrule is applied with a retentive force when a spring base fixed with a compression spring and a deforming means is rotated by manipulation of a lever provided outside after insertion of the plug.

An adaptor 11 comprises a spring base 45 which is fixed with compression springs 16, 16' for pressing the ferrules 1, 1' against a v-shaped groove 18 and provided with a projection 53 for supporting at the time of rotation and a guide 43, and an adaptor body 42 which is provided with a lock spring 25, a v-shaped groove 18, a guide 43' and a recess for supporting the spring base. A plug 47 comprises a plug body 48 which protects fragile ferrule 1' by covering the same up to the end thereof, a ferrule 1', a compression spring 49 and a screw plug 50 which apply a force on the ferrule in the axial direction to slide the same axially with the pressure, and a lock lever 56 having a projection 55 for rotating the spring base 45.

Figure 21:
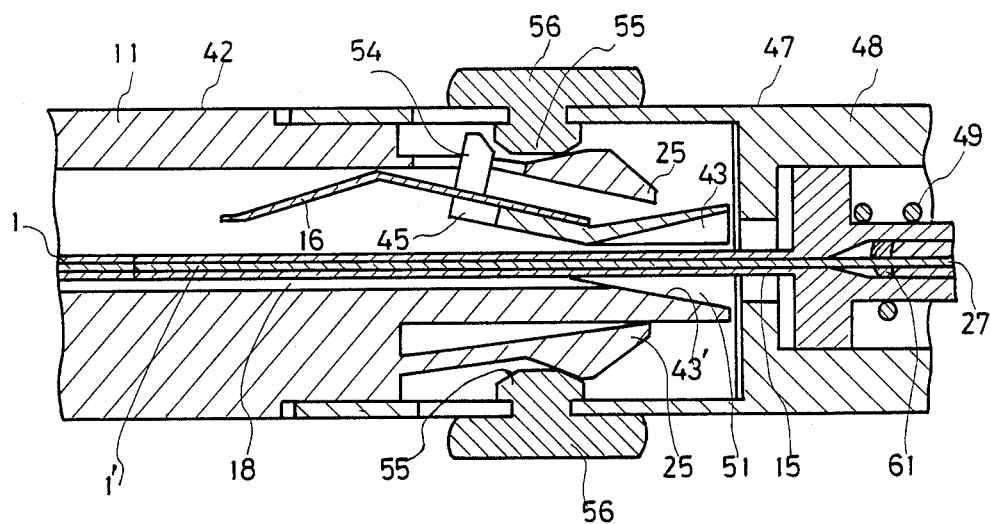
FIGS. 21 and 22 are sectional views to show the effect of the above.
Figure 22:
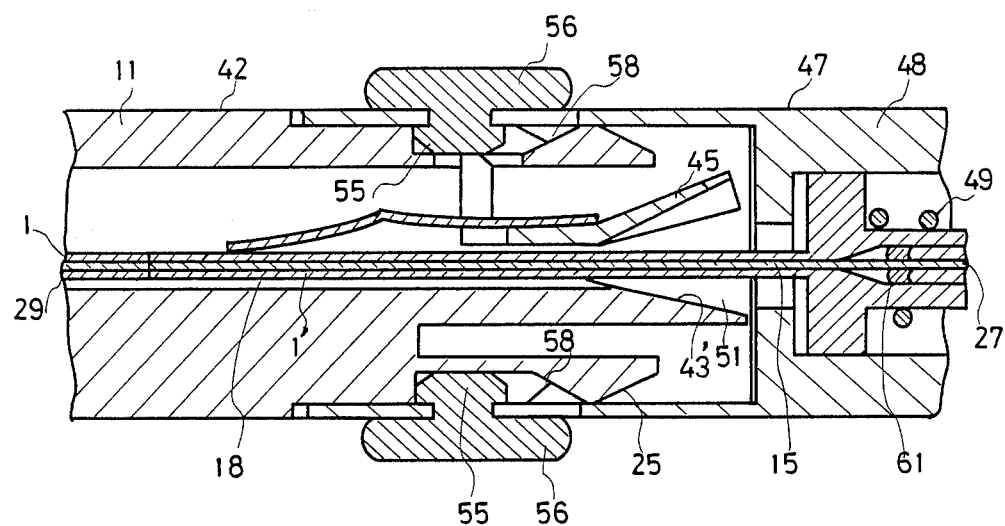

As the spring base 45 is freely rotatable before the plug 47 is inserted in the adaptor 47, the retentive force by the compression spring 16 is not yet working. As the plug 47 is being inserted into the adaptor 47, the tip end of the ferrule 1 is guided by the guides 43, 43' into the v-shaped groove 18, and is advanced along the groove toward the center. As shown in FIG. 21, because the projection 54 of the spring base 45 is not pressed yet, the spring base 45 can be rotated freely and the retentive force by the spring 16 is not in effect on the ferrule 1'. After the end of the ferrule 1' has reached the center of the adaptor, the projection 57 of the lock spring on the adaptor 11 is engaged with the projection 58 provided on the plug body when the lock lever 56 is moved. By further moving the lock lever 56, the projection 54 of the spring base 45 is pressed down to rotate the spring base 45. This makes the retentive force of the spring 16 work on the ferrule 1' to press the end thereof against the v-shaped groove 18 for optical alignment. Even if the base of the ferrule 1' is deviated from a predetermined position, the ferrule 1' is deformed with the retentive force of the spring 16 so that the end thereof is pressed against the groove 18, thereby making optical alignment possible at a low coupling loss.

As described in the foregoing, no force is applied on a ferrule when a connector is attached/detached, and yet a force can possibly be applied thereon after the ferrule has come to a coupling position. Even if the base of a ferrule is arranged slightly erroneously, the ferrule is conveniently deformed with the retentive force of a spring so that an end of the ferrule can be pressed against a v-shaped groove to thereby enable optical axes of two ferrules to be aligned for coupling at a low loss.

Figure 23:
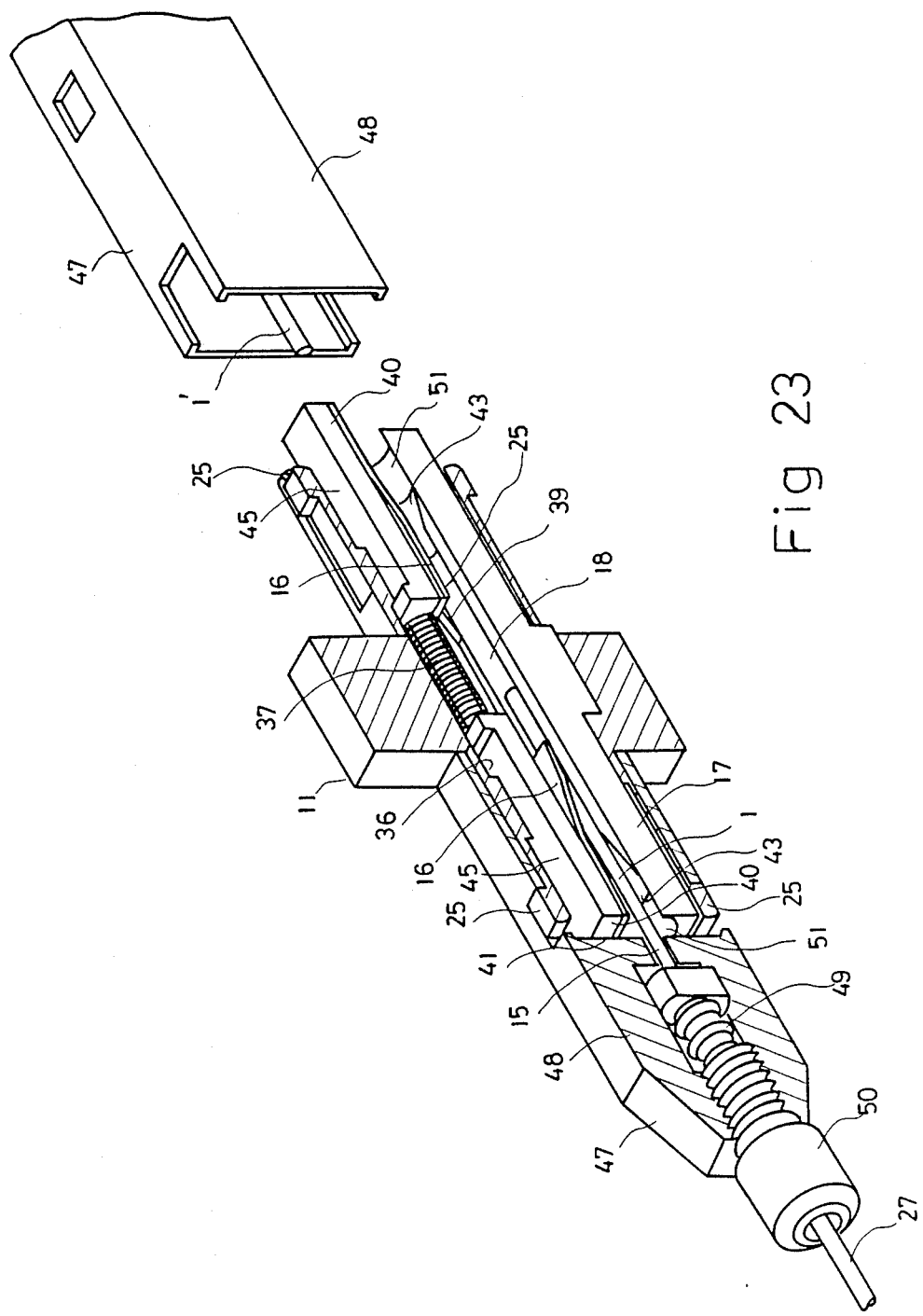
FIG. 23 is a partially exploded view of an optical connector according to this invention.

FIG. 23 is a partially exploded sectional view of another embodiment of this invention wherein a leaf spring (referred to as a retention spring hereinafter) is a deforming means, and a v-shaped groove is used as an aligning face. A ferrule 1' is bent as a retention spring 16 presses an end of a ferrule 1, and the end thereof is pressed against a v-shaped groove 18 to be aligned for optical alignment. A force is not applied by the spring before the coupling end face of the ferrule has reached a coupling point, but is applied on the end of the ferrule either immediately before or after it reached the point. A device for attaching such a retention spring comprises a pair of spring bases 45 each of which is attached with a retention spring 16, a guide groove provided in an adaptor 11, a coil spring 37 provided between the pair of spring bases 45, a projection 39 on which an end of the retention spring is stopped, and a face 41 defined by a portion of the plug 47 for pressing the rear part 40 of the spring bases.

The adaptor 11 comprises a v-shaped groove element 17 which is provided with a v-shaped groove 18 and a guide 43, a spring bases 45 fixed with a retention spring 16 for pressing the ferrule against the v-shaped groove, a coil spring 37, and an adaptor body including a lock spring 25, a guide groove 36 and a projection 39. The plug 47 is covered up to close to the end of ferrules 1, 1' for protection. The ferrule 1, 1' are loosely fixed with the compression spring 49 and the plug screw 50 which exert axial force on the ferrules inside of the plug body to make the ferrules slide.

Figure 24:
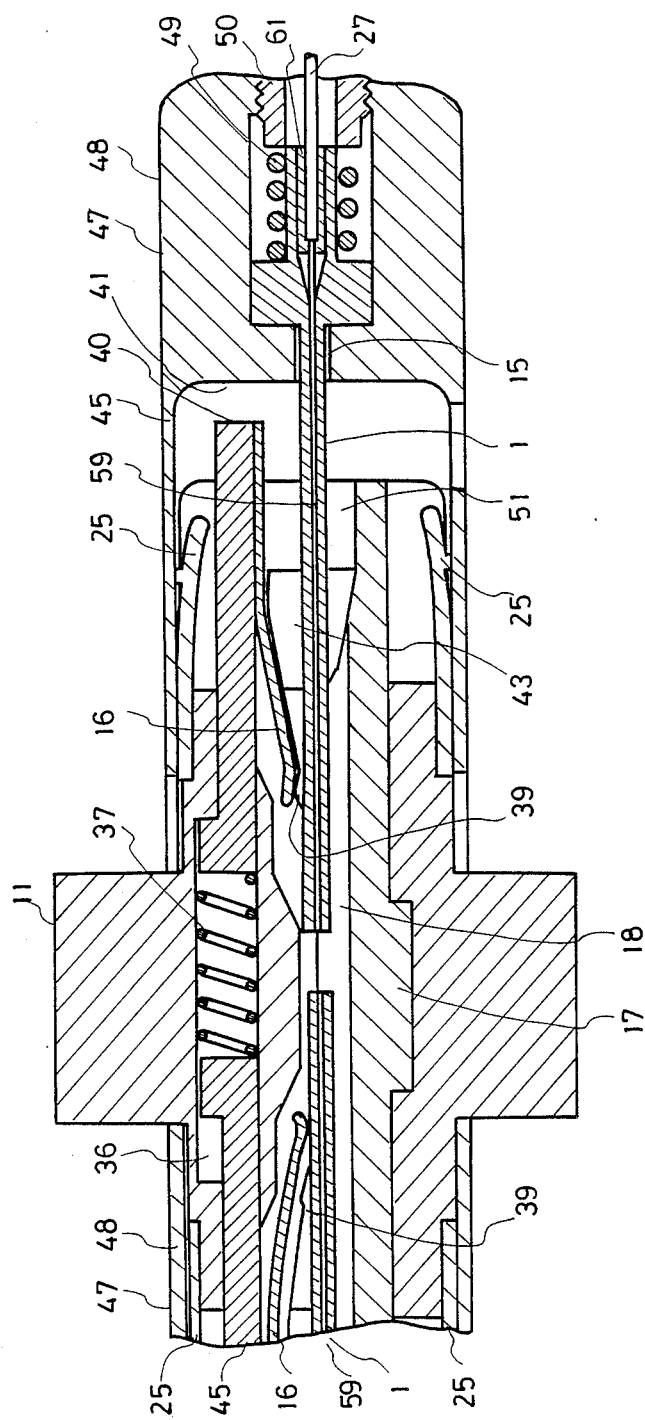
FIGS. 24 and 25 are sectional views to show the effect of the above.
Figure 25:
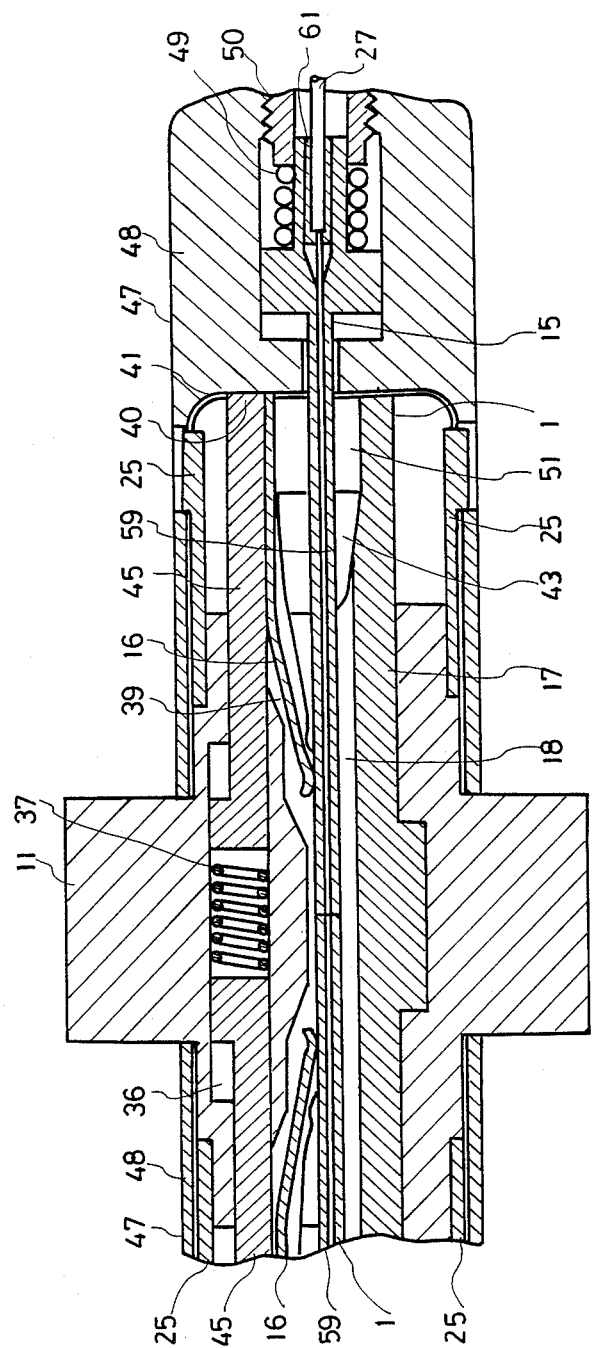

As the plug 47 is being inserted into the adaptor 11, an end thereof comes into the guide 51 to initiate engagement of the plug body 48 with the adaptor body. The end of the ferrule is guided into the v-shaped groove 18 with the guide 43 and advanced along the groove 18 toward the center. At this time, as shown in FIG. 24, the spring bases 45 are pressed with the coil spring 37 in the direction apart from the center of the adaptor. The end of the composition spring 16 fixed thereto has come to mount on and to be stopped by the projection 39. The ferrule 1' is not applied with any retentive force. When the plug 47 is further advanced, as shown in FIG. 25, immediately before the end of the ferrule reaches the center, the face 41 of the plug presses the rear part 40 of the spring bases to push the bases 45, which in turn makes the end of the retention spring 16 slip off the projection 39 to apply a force on the ferrule 1'. The end of the ferrule 1' therefore becomes prepared for coupling as it is pressed on the tip end thereof against the v-shaped groove 18.

Although the position at which a retentive force begins to be applied on the ferrule is set at a location either at or immediately before the time the coupling end of the ferrule reaches a coupling point by changing the distance between the end of the compression spring and the rear part of the spring bases or the distance between the end of the ferrule nd the face of the plug which presses the spring bases.

In the above mentioned embodiments, a spring is used as the deforming means, but the same effect can be achieved by moving or rotating a deforming means even if the spring is replaced with a projection of a raised portion of a curved member so long as it is used as a guide to deflect the ferrule into a predetermined shape.

Industrial Applicability

As described in the foregoing, this invention provides a flexible ferrule which can absorb the deviation from optical axis. By applying this advantageous ferrule, the invention can provide an optical connector which is simple in structure and economical. The optical connector has a structure which does not exert force on ferrules at the time of attachment/detachment.

This invention can therefore prevent damages on ferrules when the connector is attached/detached, reduce friction on critical elements of the optical connector such as ferrules and v-shaped grooves at attachment/detachment, and minimize dust and powder which might otherwise be generated by such friction. These advantageous features of this invention can realize a highly reliable optical connector with less deterioration which often is entailed by attachment/detachment.

As less force is needed for insertion/pull-out and good connection can be achieved even if ferrules are positioned at slightly deviated positions, this invention can realize a multi-core optical connector which connects plural optical fibers simultaneously at higher operability with less force.

This invention is applicable widely in coupling in optical communication lines.

What is claimed is:

1. A ferrule for enclosing an optical fiber comprising an annular flange having a selected diameter and a central axis, a cylindrical portion having one end formed integrally with said flange and extending parallel and coaxially from said flange with respect to said axis, said cylindrical portion having a diameter substantially smaller than said selected diameter and a selected length with said selected length being substantially greater than said diameter of said cylindrical portion, a bore extending through said cylindrical portion and through said flange, a portion of said bore within said flange having a diameter than gradually increases as the distance from said end of said cylindrical portion increases, said selected length being such as to allow a large elastic displacement at the end of said cylindrical portion opposite said one end when said flange is fixed in a position wherein the cylindrical part is made of synthetic resin containing a reinforcing filler.

2. The ferrule for connecting optical fibers which is claimed in claim 1 which is characterized in that the reinforcing agent is fibrous.

3. The ferrule for connecting optical fibers as claimed in claim 1 which is characterized in that the reinforcing agent is granular.

4. The ferrule for connecting optical fibers as claimed in claim 2 or 3 which is characterized in that the reinforcing agent is silica.

5. A connector for connecting optical fibers comprising ferrules to cover ends of each optical fibers which are to be connected with each other, the ferrules each including a flange and a cylindrical part integrally extending from the flange, and an alignment guide which aligns the two ferrules in a manner to cause the ends of the two optical fibers oppose to each other axially which is characterized in that each of said ferrules has the structure which allows a larger elastic displacement at an end thereof wherein the material of the cylindrical part of the ferrule is a synthetic resin containing a reinforcing agent.

6. The connector for connecting optical fibers as claimed in claim 5 which is characterized in that the reinforcing agent is fibrous.

7. The connector for connecting optical fibers as claimed in claim 5 which is characterized in that the reinforcing agent is granular.

8. The connector for connecting optical fibers as claimed in claim 5 or 6 which is characterized in that the reinforcing agent is silica.

9. A connector for connecting optical fibers comprising ferrules to cover ends of each optical fiber which are to be connected with each other, the ferrules each including a flange and a cylindrical part integrally extending from the flange, and alignment guide which aligns the two ferrules in a manner to cause the ends of the two optical fibers to oppose each other axially and which is characterized in that each of said ferrules includes a flange and a cylindrical portion having one end formed integrally with said flange and extending coaxially with respect thereto with the flange having a selected diameter and said cylindrical portion having a diameter substantially less than selected diameter and with said cylindrical portion having a length that is substantially greater than the diameter of said cylindrical portion so as to allow a large elastic displacement at an end thereof opposite said one end and wherein deforming means are provided to deflect said ferrules and, at the same time, to press the ends thereof against said alignment guide.

10. A connector for connecting optical fibers comprising ferrules to cover ends of each optical fiber which are to be connected with each other, the ferrules each including a flange and a cylindrical part integrally extending from the flange, and an alignment guide which aligns the two ferrules in a manner to cause the ends of the two optical fibers to oppose each other axially and which is characterized in that each of said ferrules includes a flange and a cylindrical portion having one end formed integrally with said flange and extending coaxially with respect thereto with the flange having a selected diameter and said cylindrical portion having a diameter substantially less than said selected diameter and with said cylindrical portion having a length that is substantially greater than the diameter of said cylindrical portion so as to allow a large elastic displacement at an end thereof opposite said one end, said connector including deforming means to deflect said ferrules and, at the same time, to press the ends thereof against said alignment guide.

11. The connector for connecting optical fibers as claimed in claim 10 which is characterized in that the deforming means are springs provided within the connector.

12. The connector for connecting optical fibers as claimed in claim 10 which is characterized in that the deforming means are arranged to oppose each other in a moving manner, and the connector is further provided with a groove in which said deforming means can move, a member which moves the deforming means, and a mechanism which moves the deforming means in the space or the groove to position the ends thereof at predetermined positions on the guide and at immediately adjacent the ferrules reach a predetermined coupling position, press said deforming means on the ferrules.

13. The connector for connecting optical fibers as claimed in claim 10 which is characterized in that the large elastic displacement is expressed as $L^2/D \geq 2.4 \cdot E_f/S_f$ wherein the outer diameter and length of the cylindrical part are denoted with D and L and Young's module and yielding stress of the material of the cylindrical part are denoted with $E_f$ and $S_f$.

14. The connector for connecting optical fibers as claimed in claim 10 which is characterized in that the producible large elastic displacement is 0.5 mm or more at an end of the cylindrical part.

15. The connector for connecting optical fibers as claimed in claim 10 which is characterized in that the cylindrical part is made of synthetic resin containing a reinforcing agent.

16. The connector for connecting optical fibers as claimed in claim 10 which is characterized in that the reinforcing agent is fibrous.

17. The connector for connecting optical fibers as claimed in claim 10 which is characterized in that the reinforcing agent is granular.

18. The connector for connecting optical fibers as claimed in claim 16 or 17 which is characterized in that the reinforcing agent is silica.

19. The connector for connecting optical fibers as claimed in claim 10 which is characterized in that the guide is a groove which has a section of the letter V form.

20. The connector for connecting optical fibers as claimed in claim 10 which is characterized in that plural pairs of optical fibers are arranged in parallel to each other.

* * * * *